United States Patent
Chakrabarti et al.

(10) Patent No.: US 8,174,224 B2
(45) Date of Patent: May 8, 2012

(54) TORQUE PRODUCTION IN AN ELECTRIC MOTOR IN RESPONSE TO CURRENT SENSOR ERROR

(75) Inventors: Sibaprasad Chakrabarti, West Midnapur (IN); Mengwei Campbell, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 431 days.

(21) Appl. No.: 12/470,803

(22) Filed: May 22, 2009

(65) Prior Publication Data

US 2010/0295500 A1  Nov. 25, 2010

(51) Int. Cl.
*H02P 7/00* (2006.01)

(52) U.S. Cl. ........ 318/432; 318/430; 318/434; 318/632; 701/42

(58) Field of Classification Search .................. 318/432, 318/621, 632, 434, 430; 701/42
See application file for complete search history.

(56) References Cited

U.S. PATENT DOCUMENTS

2008/0201041 A1* 8/2008 Jiang .............................. 701/42

OTHER PUBLICATIONS

Schulz, S.E. et al. "Harmonic Torque Ripple Reduction at Low Motor Speeds," U.S. Appl. No. 12/108,868, filed Apr. 24, 2008.

* cited by examiner

*Primary Examiner* — Paul Ip
(74) *Attorney, Agent, or Firm* — Ingrassia Fisher & Lorenz, P.C.

(57) ABSTRACT

Methods and systems are provided for producing a commanded torque in an electric motor in a vehicle. A method comprises obtaining a torque command, obtaining a speed of the electric motor, and operating the inverter based at least in part on a voltage command that corresponds to minimal current through the electric motor for producing the commanded torque at the instantaneous speed of the electric motor.

20 Claims, 3 Drawing Sheets

TORQUE PRODUCTION IN AN ELECTRIC MOTOR IN RESPONSE TO CURRENT SENSOR ERROR

TECHNICAL FIELD

Embodiments of the subject matter described herein relate generally to electric motor drive systems, and more particularly, embodiments of the subject matter relate to methods and apparatus for controlling torque produced by electric motors in response to a current sensor error.

BACKGROUND

In vehicles using electric traction motors, alternating current (AC) motor drives are used to provide a requested torque to the motor shaft. In practice, the amount of torque produced by the motor is directly related (although not perfectly proportional) to the amount current provided to the motor. Therefore, by regulating and precisely controlling the input current to the electric motor, the amount of torque produced by the electric motor may be more accurately controlled. In response to a changing torque command, the motor torque response is smoother and/or faster when the amount of current provided to the electric motor is adjusted based on the torque command.

For purposes of efficiency, particularly in hybrid and/or electric vehicles, it is desirable to maximize the ratio of the output torque to the input motor current. However, in many systems, the input motor current is not directly controlled. For example, many electric motors are operated using pulse-width modulation (PWM) techniques in combination with an inverter (or another switched-mode power supply) to control the voltage across the motor windings, which in turn, produces the desired current in the motor. In response to a requested torque (or commanded torque), most prior art systems determine a desired input motor current for producing the requested amount of torque and utilize a closed loop control system to control the current through the motor windings and thereby regulate the amount of torque produced the motor. One or more sensors are used to measure the actual motor current, which is then compared to the desired input motor current. Based on the outcome of the comparison, the PWM commands for the inverter are adjusted to increase and/or decrease the voltage across the motor windings, such that the actual measured motor current tracks the desired input motor current.

However, when a current sensor does not accurately measure the motor current, these closed-loop control systems can no longer effectively control the motor torque. For example, without accurate motor current information, the control system may cause the motor to produce insufficient torque, excessive torque, or varying or oscillating amounts of torque. Furthermore, as a preventative measure in some prior systems, in response to a current sensor error, the control system may cease providing current and/or voltage to the electric motor, or drastically reduce the amount of current and/or voltage provided to the electric motor. As a result, in prior art systems, when a current sensor error occurs, the use and enjoyment of a particular vehicle is adversely affected.

BRIEF SUMMARY

A method is provided for producing a commanded torque in an electric motor in a vehicle. In an exemplary embodiment, the method comprises obtaining a torque command, obtaining a speed of the electric motor, and operating the inverter based at least in part on a voltage command that corresponds to minimal current through the electric motor for producing the commanded torque at the instantaneous speed of the electric motor.

In accordance with one embodiment, a method is provided for controlling an electric motor in response to a torque command. The method comprises obtaining the torque command and obtaining a motor speed for the electric motor. The method further comprises obtaining a voltage command corresponding to a minimal motor current for the torque command and the motor speed and obtaining a slip frequency command corresponding to the minimal motor current for the torque command and the motor speed. The method further comprises operating an inverter configured to drive the electric motor based on the voltage command and the slip frequency command.

In accordance with another embodiment, an electrical system for use in a vehicle is provided. The electrical system comprises an energy source, an electric motor, an inverter coupled between the energy source and the electric motor. A resolver system is coupled to the electric motor and the resolver system is configured to obtain a motor speed for the electric motor. A controller is coupled to the inverter and the resolver system, and the controller is configured to obtain a torque command and operate the inverter based at least in part on a voltage command and a slip frequency command corresponding to minimal motor current for the combination of the torque command and the motor speed.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in the figures may depict one exemplary arrangement of elements, additional intervening elements, devices, features, or components may be present in an embodiment of the depicted subject matter.

For the sake of brevity, conventional techniques related to current sensing, signaling, motor control, induction motors, pulse-width modulation (PWM), switched-mode power supplies (SMPS), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to controlling the amount of torque produced by electric motors in the event of a current sensor error. As described in greater detail below, the torque capability for electric motor versus the speed of the electric motor may be determined, and the minimum amount of motor current needed for producing the amount of torque may be calculated and/or determined for each possible combination of achievable torque and motor speed. The electric motor may be operated with minimum amount of motor current, and the resulting voltage across the motor windings and the slip frequency recorded. In response to a current sensor error, the recorded voltage and slip frequency may then be used to control the amount of torque produced by the electric motor. As used herein, the meaning of subscription and superscription is as follows:

Subscript d and q: Quantity in the d-q frame. The d-q frame of reference, in Cartesian coordinates, is synchronous with the rotation of a rotor within the electric motor.

Superscript *: Quantity which is commanded.

Figure 1:
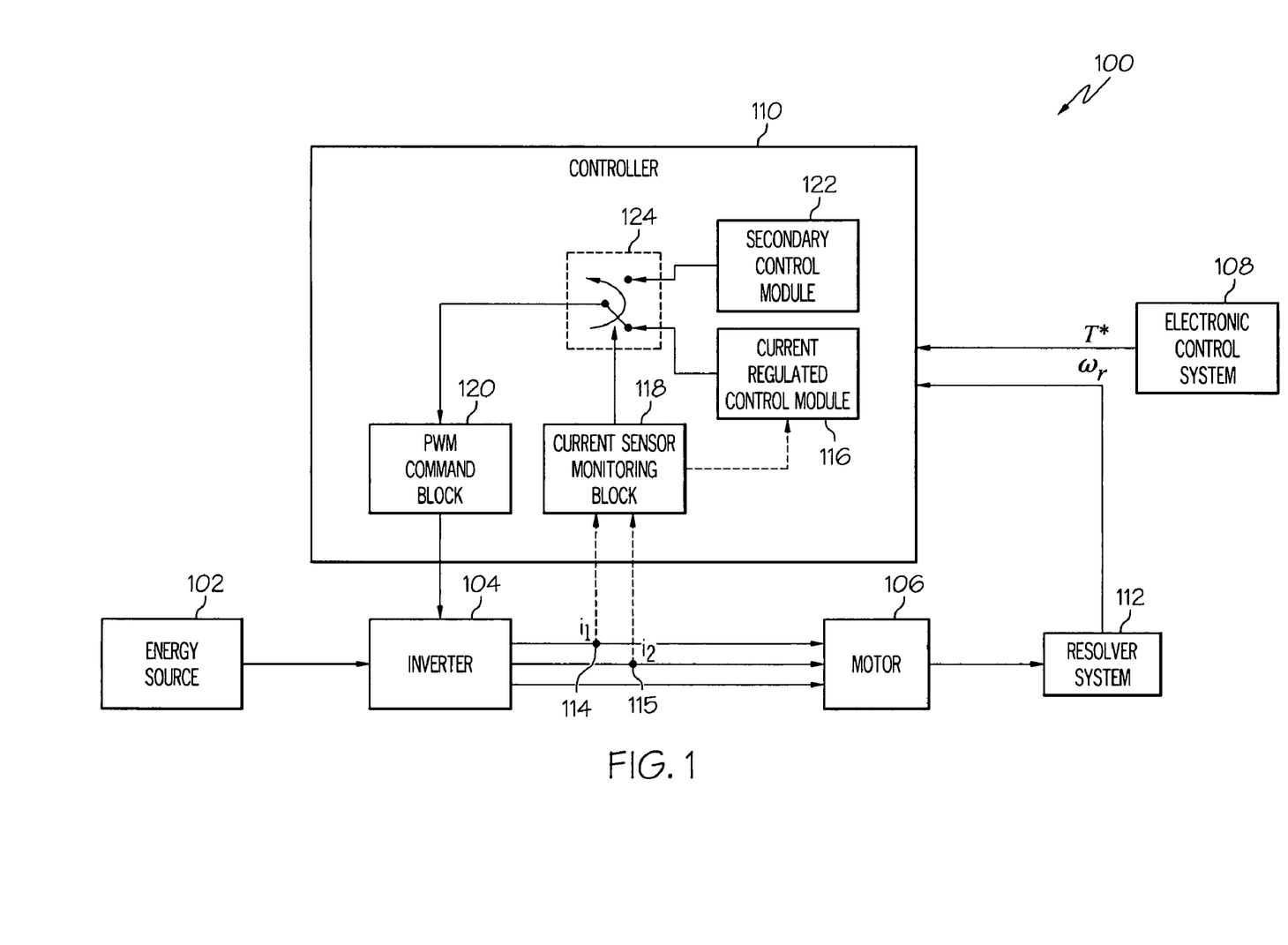
FIG. 1 is a block diagram of an electrical system in accordance with one embodiment.

FIG. 1 depicts an exemplary embodiment of an electrical system 100 suitable for use in a vehicle, such as, for example, a hybrid and/or electric automotive vehicle. In an exemplary embodiment, the electrical system 100 includes, without limitation, an energy source 102, an inverter 104, an electric motor 106, an electronic control system 108, a controller 110, a resolver system 112, and one or more current sensors 114. It should be understood that FIG. 1 is a simplified representation of an electrical system 100 for purposes of explanation and is not intended to limit the scope of the subject matter in any way.

In an exemplary embodiment, the energy source 102 is coupled to the inverter 104, which in turn is coupled to the electric motor 106. In an exemplary embodiment, one or more current sensors 114 are coupled between the inverter 104 and the electric motor 106 and configured to measure the current flowing through the electric motor 106. The controller 110 is coupled to the current sensors 114 and configured to obtain the measured motor current from the current sensors 114. The resolver system 112 is coupled between the electric motor 106 and the controller 110, and the resolver system 112 is suitably configured to measure or otherwise obtain the motor speed ($\omega_r$), that is, the rotational speed of the rotor within the electric motor 106, and provide the result to controller 110. The electronic control system 108 is coupled to the controller 110, and the electronic control system 108 is suitably configured to provide a torque command (T*) to the controller 110. As described in greater detail below, in an exemplary embodiment, the controller 110 is suitably configured to utilize pulse-width modulation (PWM) techniques to regulate the current and/or voltage provided to the electric motor 106 via the inverter 104 such that the torque produced by the electric motor 106 tracks the torque command (T*) provided by the electronic control system 108. In an exemplary embodiment, the controller 110 is configured to control the electric motor 106 for the commanded torque (T*) in a manner that minimizes the motor current, as described in greater detail below.

The energy source 102 provides electrical energy and/or voltage to the inverter 104 for driving the electric motor 106. Depending on the embodiment, the energy source 102 may be realized as a battery, a fuel cell, a rechargeable high-voltage battery pack, an ultracapacitor, or another suitable energy source known in the art. In an exemplary embodiment, the electric motor 106 is realized as an induction motor, however, in practical embodiments, another suitable electric motor may be used, such as, for example, an internal permanent magnet (IPM) motor, a synchronous reluctance motor, or another suitable motor known in the art, and the subject matter is not intended to be limited to use with a particular type of electric motor. In the embodiment shown in FIG. 1, the electric motor 106 is a three-phase alternating current (AC) electric machine having a rotor and stator windings. However, it should be understood that although the subject matter may be described herein in the context of a three-phase electric motor, the subject matter is not limited to three-phase machines and may be adapted for an electric motor having any number of phases.

In an exemplary embodiment, the inverter 104 is realized as a power inverter configured to convert the DC power from the energy source 102 into AC power for driving the electric motor 106. The inverter 104 preferably includes a plurality phase legs coupled to corresponding phases of the electric motor 106, wherein switches of the phase legs are modulated (opened or closed) with a particular duty cycle to produce an effective AC voltage across the stator windings of the electric motor 106, which in turn creates torque-producing current in the stator windings and operates the electric motor 106, as will be appreciated in the art.

In an exemplary embodiment, the electronic control system 108 may include various sensors and automotive control modules, electronic control units (ECUs), and the like, and the electronic control system 108 may be coupled to additional vehicle components, as will be appreciated in the art. In an exemplary embodiment, the electronic control system 108 generates a torque command (T*) in response to a request for torque (e.g., a driver depressing an accelerator pedal or throttle), and provides the torque command to the controller 110.

The controller 110 generally represents the hardware, software, and/or firmware components configured to control or otherwise regulate the torque produced by the electric motor 106 and perform additional tasks and/or functions described in greater detail below. In this regard, the controller 110 varies the duty cycle and/or switching frequency of the PWM command signals used to modulate the switches of the inverter phase legs, such that the torque produced by the electric motor 106 tracks the torque command (T*).

In an exemplary embodiment, the resolver system 112 comprises a resolver coupled to the electric motor 106, and the output of the resolver is coupled to a resolver-to-digital converter. The resolver (or similar speed sensing device) senses the position of the rotor and, thereby, derives the speed ($\omega_r$) of the electric motor 106 (alternatively referred to herein as the motor speed or rotor speed). The resolver-to-digital converter converts the signals from the resolver to digital signals (e.g., a digital motor speed signal) which are provided to the controller 110.

In an exemplary embodiment, the controller 110 includes, without limitation, a current regulated control module 116, a current sensor monitoring block 118, a PWM command block 120, a voltage control module 122, and a selection arrangement 124. The current sensor monitoring block 118 is coupled between the current sensors 114 and the current regulated control module 116. The current regulated control module 116 is configured to produce commands for generating PWM signals for the phase legs of the inverter 104 based on a current command and the measured motor current obtained by the current sensors 114. As described in greater detail below, the voltage control module 122 is also configured to produce commands for generating PWM signals for the phase legs of the inverter 104. The output of the current regulated control module 116 and the output of the voltage control module 122 are each coupled to the selection arrangement 124. The current sensor monitoring block 118 is coupled to the selection arrangement 124 and configured to utilize the selection arrangement 124 to select which commands are provided to the PWM command block 120, as described in greater detail below. The PWM command block 120 generates PWM command signals and operates the phase legs of the inverter 104 based on the commands provided to the PWM command block 120 from either the current regulated control module 116 or the voltage control module 122 via the selection arrangement 124.

Figure 2:
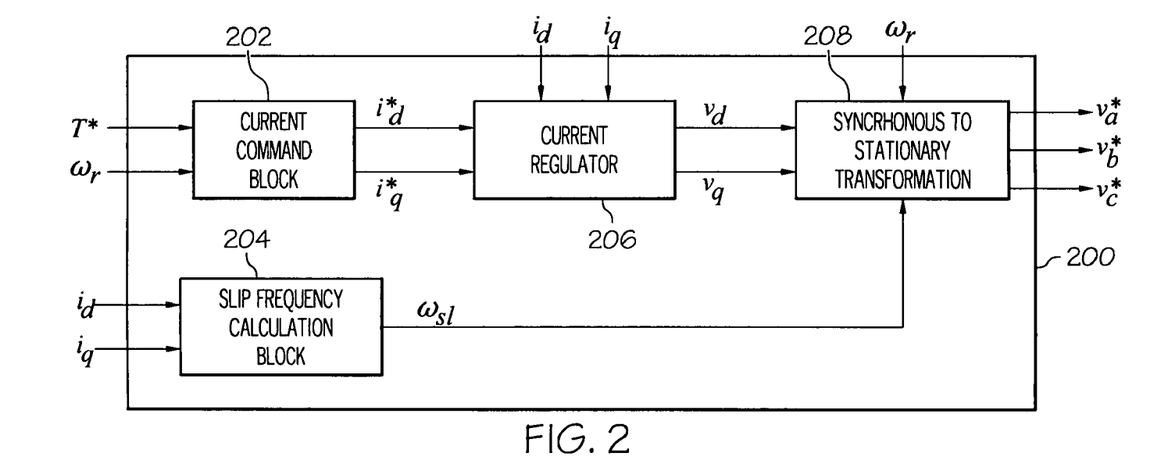
FIG. 2 is a detailed block diagram of a current regulated control module suitable for use in the electrical system of FIG. 1 for a d-q reference frame implementation illustrating additional components and intermediate signals between components in accordance with one embodiment.

FIG. 2 depicts an exemplary embodiment of a current regulated control module 200 suitable for use in the controller 110 of FIG. 1. The current regulated control module 200 includes, without limitation, a current command block 202, a slip frequency calculation block 204, a current regulator 206, and a synchronous-to-stationary transformation block 208. In an exemplary embodiment, the current command block 202 is coupled to the current regulator 206, which in turn is coupled to the synchronous-to-stationary transformation block 208. The slip frequency calculation block 204 is also coupled to the synchronous-to-stationary transformation block 208. The current regulated control module 200 is configured to obtain a torque command (T*) (e.g., from the electronic control system 108), a motor speed ($\omega_r$) (e.g., from the resolver system 112), and a measured motor current ($i_d$ and $i_q$). The current regulated control module 200 generates stationary frame voltage commands ($v^*_a$, $v^*_b$, and $v^*_c$) for generating PWM command signals for operating an inverter (e.g., inverter 104), such that the torque produced by an electric motor (e.g., electric motor 106) tracks the torque command (T*), as described in greater detail below.

The current command block 202 generates a current command for producing the commanded torque in the electric motor 106 based at least in part on a torque command (T*) and the instantaneous motor speed ($\omega_r$). In this regard, although not illustrated, in practical embodiments, the current command may also account for other operating parameters of the electrical system 100, such as, for example, the voltage of the energy source 102. In an exemplary embodiment, the current command is realized as a synchronous frame stator current command comprising two components relative to the d-q reference frame, $i^*_d$ and $i^*_q$. It should be appreciated that although the subject matter is described herein in the context of the synchronous reference frame, the subject matter is not limited to any particular reference frame or notation.

As described in greater detail below, in an exemplary embodiment, the current command block 202 includes or otherwise implements a table or database that stores and/or maintains, for each possible combination of torque command and motor speed, synchronous frame current commands that correspond to the minimum current for producing the commanded (or desired) torque. The synchronous frame current commands may be predetermined and/or obtained during a motor characterization process, after which the synchronous frame currents are mapped to the corresponding torque and/or motor speed values and stored in the table and/or database.

In an exemplary embodiment, the current regulator 206 is configured to obtain the measured motor current in the electric motor 106. In the illustrated embodiment, the current regulator 206 is realized as a synchronous frame current regulator configured to obtain the measured motor current in the d-q reference frame ($i_d$ and $i_q$). In an exemplary embodiment, the outputs of the current regulator 206 are intermediate synchronous frame voltages $v_d$ and $v_q$, which are processed by the synchronous-to-stationary transformation block 208 to obtain three-phase stationary frame voltage commands ($v^*_a$, $v^*_b$, and $v^*_c$), as described in greater detail below. The synchronous frame current regulator 206 regulates the motor current such that the measured current ($i_d$ and $i_q$) in the electric motor 106 tracks the current commands ($i^*_d$ and $i^*_q$). In this regard, the voltage output ($v_d$ and $v_q$) of the current regulator 206 increases and/or decreases based on the difference between the current command ($i^*_d$ and $i^*_q$) and the measured motor current ($i_d$ and $i_q$), as will be appreciated in the art.

The slip frequency calculation block 204 calculates the slip frequency ($\omega_{sl}$) for the electric motor (e.g., electric motor 106) based on the measured motor current and provides the result to the synchronous-to-stationary transformation block 208. The synchronous-to-stationary transformation block 208 transforms the intermediate voltages from the output of the current regulator 206 into corresponding three-phase voltage commands in the stationary reference frame ($v^*_a$, $v^*_b$, and $v^*_c$) based on the slip frequency ($\omega_{sl}$) and the motor speed ($\omega_r$) in a conventional manner, as will be appreciated in the art. As described in greater detail below, three-phase stationary voltage commands are used by a PWM command block (e.g., PWM command block 120) to generate PWM command signals to operate the inverter and produce the commanded voltages across the stator windings of the electric motor, thereby producing the commanded torque in the electric motor.

Figure 3:
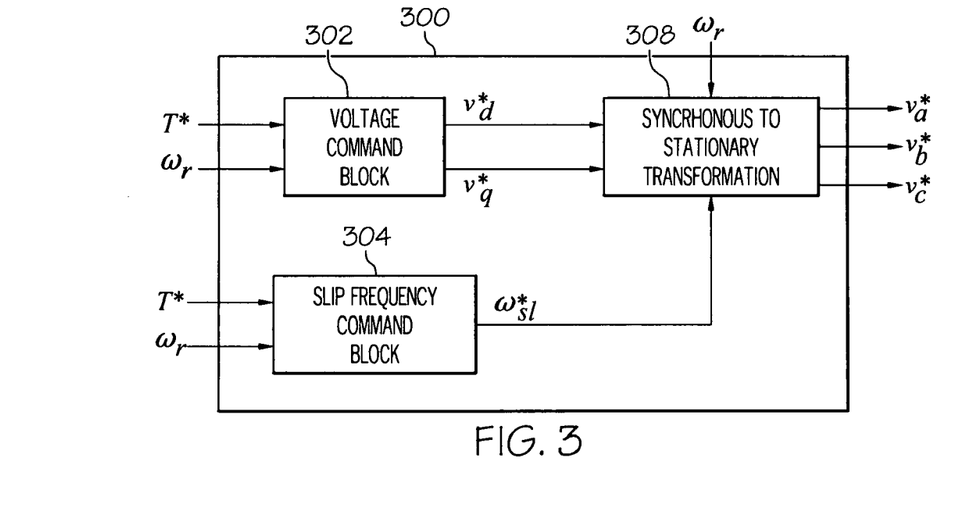
FIG. 3 is a detailed block diagram of a voltage control module suitable for use in the electrical system of FIG. 1 for a d-q reference frame implementation illustrating additional components and intermediate signals between components in accordance with one embodiment.

FIG. 3 depicts an exemplary embodiment of a voltage control module 300 suitable for use in the controller 110 of FIG. 1. The voltage control module 300 includes, without limitation, a voltage command block 302, a slip frequency command block 304, and a synchronous-to-stationary transformation block 308. In an exemplary embodiment, the voltage command block 302 is coupled to the synchronous-to-stationary transformation block 308. The slip frequency command block 304 is also coupled to the synchronous-to-stationary transformation block 308. The voltage control module 300 is configured to obtain a torque command (T*) (e.g., from the electronic control system 108) and a motor speed ($\omega_r$) (e.g., from the resolver system 112). The voltage control module 300 generates stationary frame voltage commands ($v^*_a$, $v^*_b$, and $v^*_c$) for generating PWM signals for operating an inverter (e.g., inverter 104) and control the torque produced by an electric motor (e.g., electric motor 106), as described in greater detail below.

The voltage command block 302 generates a voltage command to operate an electric motor with the commanded torque based on the torque command (T*) and an instantaneous motor speed ($\omega_r$). In an exemplary embodiment, the voltage command is realized as a synchronous frame voltage command comprising two components relative to the d-q reference frame, $v^*_d$ and $v^*_q$. As described in greater detail below, in an exemplary embodiment, the voltage command block 302 includes or otherwise implements a table or database that stores and/or maintains, for each possible combination of torque command and motor speed, synchronous frame voltages that correspond to the minimum current for producing the commanded (or desired) torque. In this regard, the voltage commands may be obtained by storing the synchronous frame output voltages (e.g., $v_d$ and $v_q$) of a current regulator (e.g., current regulator 206) during a motor characterization process, as described in greater detail below.

In a similar manner, the slip frequency command block 304 obtains a slip frequency command based on the torque command (T*) and the instantaneous motor speed ($\omega_r$). The slip frequency command block 304 may include or otherwise implement a table (or database) that stores and/or maintains, for each possible combination of torque command and motor speed, a slip frequency that correspond to the minimum current for producing the commanded torque. The slip frequency commands may be obtained by storing the measured and/or calculated slip frequencies (e.g., the output of slip frequency calculation block 204) within a current regulated control module 200 during a motor characterization process, after which the slip frequencies are mapped to the corresponding torque and/or motor speed values and stored in the table and/or database. In the absence of accurate feedback information for calculating and/or determining the actual slip frequency, the slip frequency commands represent an estimated slip frequency for an electric motor producing a commanded torque (T*) with minimum input current at the instantaneous motor speed ($\omega_r$).

The synchronous-to-stationary transformation block 308 transforms the voltage commands from the voltage command block 302 into corresponding three-phase voltage commands in the stationary reference frame ($v^*_a$, $v^*_b$, and $v^*_c$) in a similar manner as set forth above in the context of synchronous-to-stationary transformation block 208. As described in greater detail below, the three-phase voltage commands are used by a PWM command block (e.g., PWM command block 120) to operate the phase legs of an inverter to produce the commanded voltages across the stator windings of the electric motor.

Figure 4:
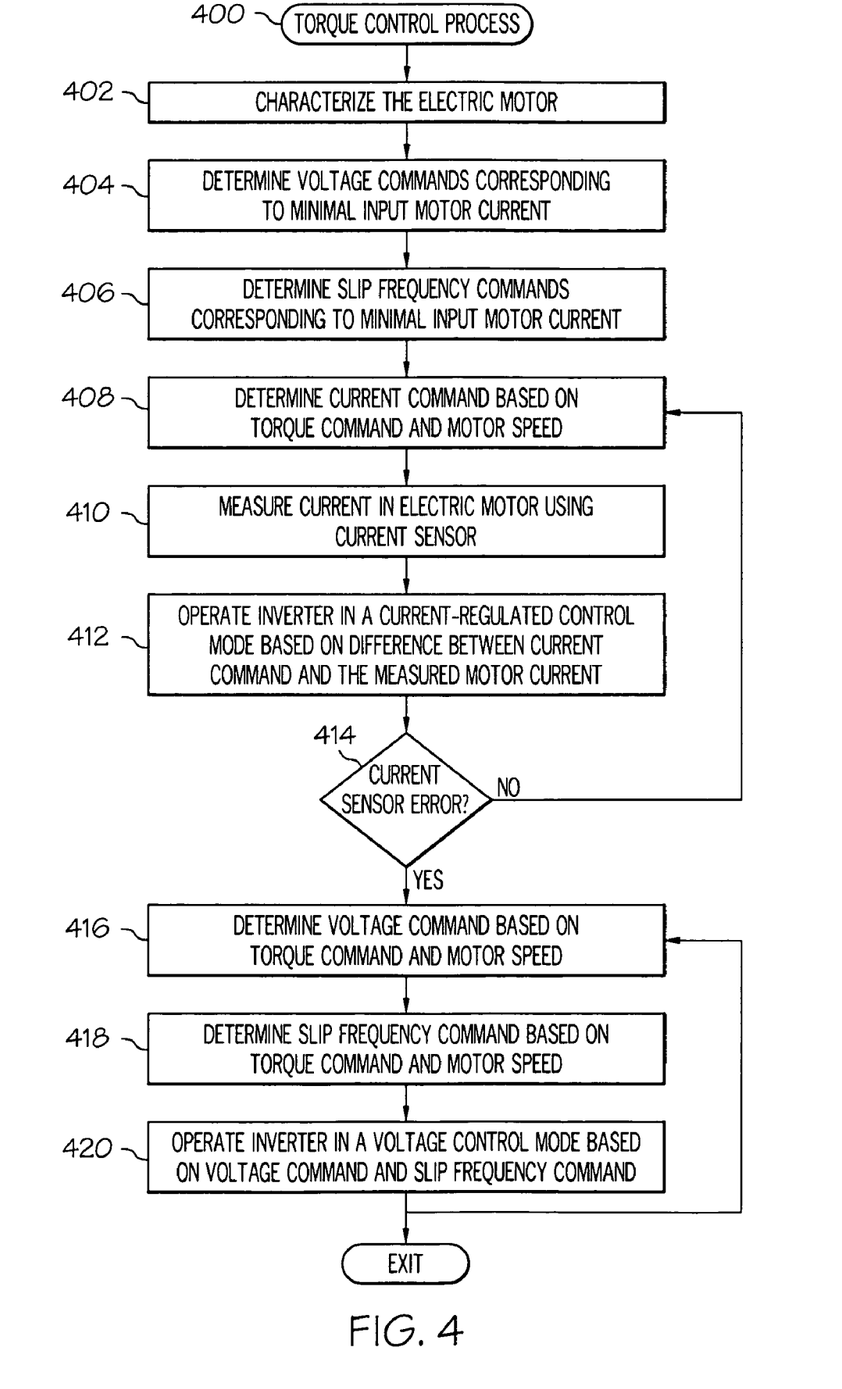
FIG. 4 is a flow diagram of a torque control process suitable for use with the electrical system of FIG. 1 in accordance with one embodiment.

Referring now to FIG. 4, in an exemplary embodiment, an electrical system may be configured to perform a torque control process 400 and additional tasks, functions, and operations described below. The various tasks may be performed by software, hardware, firmware, or any combination thereof. For illustrative purposes, the following description may refer to elements mentioned above in connection with FIG. 1, FIG. 2, and FIG. 3. In practice, the tasks, functions, and operations may be performed by different elements of the described system, such as the controller 110, the current regulated control module 116, the current sensor monitoring block 118, the voltage control module 122, the selection arrangement 124, and/or the PWM command block 120. It should be appreciated that any number of additional or alternative tasks may be included, and may be incorporated into a more comprehensive procedure or process having additional functionality not described in detail herein.

Referring to FIG. 4, and with continued reference to FIG. 1, FIG. 2 and FIG. 3, a torque control process 400 may be performed to control and/or regulate the torque produced by an electric motor. In an exemplary embodiment, the torque control process 400 initializes or begins by characterizing the electric motor (task 402). In this regard, the electric motor is analyzed and/or characterized for purposes of determining commands for controlling operation of the inverter such that the electric motor achieves a commanded amount of torque with minimal input current for the particular motor speed. In an exemplary embodiment, the electric motor is characterized on a test bench, in a lab, and/or using software and/or computer simulations before the electrical system 100 and/or electric motor 106 are implemented in a vehicle. For example, in accordance with one embodiment, the torque capability versus motor speed for the electric motor 106 is determined, resulting in a range of achievable (or possible) torque values and corresponding range of achievable (or possible) motor speeds. For each particular combination of torque value and motor speed value, the minimum synchronous frame current needed to produce the particular torque may be determined and/or calculated. The resulting minimum synchronous frame current may then be stored and/or maintained in a table or database (e.g., within current command block 202) that maintains the association between the synchronous frame current and the corresponding torque and motor speed combination.

In an exemplary embodiment, the torque control process 400 continues by determining voltage commands for achieving the commanded amount of torque with minimal input motor current (task 404). For example, in accordance with one embodiment, after determining the minimum synchronous frame current for each possible combination of torque and motor speed, the electric motor may be operated by iteratively commanding the electric motor for each possible combination of torque and motor speed using the current regulated control module 200. The synchronous voltage output of the current regulator 206 ($v_d$ and $v_q$) is obtained and/or stored in a table or database (e.g., within voltage command block 302) that maintains the association between synchronous voltage and the respective combination of torque value and speed value. In this manner, the voltage commands correspond to the output voltage of the synchronous frame current regulator 206 when the electric motor is being controlled and/or operated with minimal input current for the combination of commanded torque and motor speed.

In an exemplary embodiment, the torque control process 400 also determines and/or calculates slip frequency commands for achieving the commanded amount of torque with minimal input motor current (task 406). For example, in accordance with one embodiment, the electric motor may be operated by iteratively commanding the electric motor for each possible combination of torque and motor speed using the current regulated control module 200, and the slip frequency of the electric motor may be simultaneously calculated and/or determined for each possible combination of torque and motor speed. The slip frequency commands are stored in a table or database (e.g., within slip frequency command block 304) that maintains the association between slip frequency and the respective combination of torque value and speed value. In this manner, for each possible combination of torque and motor speed, the slip frequency commands and the voltage commands correspond to operating and/or controlling the electric motor for producing the commanded torque and/or motor speed with minimal input motor current.

In an exemplary embodiment, after performing the motor characterization, the torque control process 400 continues by operating the inverter and/or electrical system in a current-regulated control mode. In this regard, the electrical system 100 and/or controller 110 may be deployed in a vehicle and configured to initially operate in the current-regulated control mode, for example, the selection arrangement 124 may be initially configured such that the output of the current regulated control module 116 is provided to the input of the PWM command block 120. In this regard, the current regulated control module 116 is coupled to the PWM command block 120 via the selection arrangement 124.

In an exemplary embodiment, in the current-regulated control mode, the torque control process 400 determines a current command based on a torque command and the instantaneous motor speed, measures the current through the electric motor using one or more current sensors, and operates the inverter and/or electrical system based on a difference between the current command and the measured motor current to produce a commanded torque with minimal input current to the electric motor (tasks 408, 410, 412). In an exemplary embodiment, in the current-regulated control mode, the current command block 202 determines and/or obtains synchronous frame current commands ($i^*_d$ and $i^*_q$) (e.g., from a table and/or database implemented within the current command block 202) based at least in part on the torque command (T*) and the instantaneous speed ($\omega_r$) of the electric motor 106. The current sensors 114 measure and/or sense the current in the electric motor 106, and the current sensor monitoring block 118 obtains the measured motor current and transforms the measured motor current into a synchronous frame motor current ($i_d$ and $i_q$). The synchronous frame current regulator 206 compares the synchronous frame motor current ($i_d$ and $i_q$) to the current commands ($i^*_d$ and $i^*_q$), and based on the comparison, generates a synchronous voltage ($v_d$ and $v_q$) for producing the commanded current (and thereby the commanded torque) in the electric motor 106. The slip frequency calculation block 204 calculates the slip frequency ($\omega_{sl}$) of the electric motor 106 based on the measured motor current, and the slip frequency is then utilized by the synchronous-to-stationary transformation block 208 to generate stationary voltage commands ($v^*_a$, $v^*_b$, and $v^*_c$) for producing the commanded current (or torque) based on the desired synchronous voltage ($v_d$ and $v_q$). The PWM command block 120 determines PWM command signals for the phase legs of the inverter 104 based on the stationary voltage commands ($v^*_a$, $v^*_b$, and $v^*_c$) such that the effective AC voltages across the corresponding phases of the stator windings are substantially equal (within practical and/or realistic operating tolerances) to the stationary voltage commands, as will be appreciated in the art. In this manner, the current regulated control module 116, 200 increases and/or decreases the voltage commands ($v^*_a$, $v^*_b$, and $v^*_c$) provided to the PWM command block 120, which causes the PWM command block 120 to produce a corresponding increase and/or decrease in the voltage across the stator windings of the electric motor 106, such that the motor current tracks the current command, and as a result, the torque produced by the electric motor 106 tracks the torque command.

In an exemplary embodiment, the torque control process 400 continues by determining and/or identifying whether an error has occurred in a current sensor (task 414). In an exemplary embodiment, during operation of the controller 110 in the current-regulated control mode, the current sensor monitoring block 118 routinely verifies that the current sensors 114 are all functioning properly. In this regard, the current sensor monitoring block 118 may perform one or more diagnostic tests on the current sensors 114 and/or the measured values from the current sensors 114 to determine whether an error has occurred in at least one of the current sensors 114. For example, assuming three-phase balanced operation, the sum of the three phase currents to the electric motor 106 should be equal to zero (within realistic and/or practical operating tolerances). In this regard, the current sensor monitoring block 118 may identify and/or detect when the sum of the three-phase currents measured by the current sensors 114 are not equal to zero. It should be appreciated that there are various different methods and/or diagnostic tests for identifying a current sensor error, and the subject matter is not limited to any particular method. In an exemplary embodiment, if the current sensor monitoring block 118 determines that no errors have occurred and that all current sensors 114 are functioning normally, the current sensor monitoring block 118 continues by obtaining the motor current from the current sensors 114 and providing the synchronous frame representation of the measured motor current ($i_d$ and $i_q$) to the current regulated control module 116, 200, and the electrical system 100 continues operating in the current-regulated control mode (tasks 408, 410, 412), as set forth above.

In response to determining and/or identifying a current sensor error, the torque control process 400 continues by operating the inverter and/or electrical system in a voltage control mode. In the voltage control mode, the inverter and/or electrical system is operated without reliance on feedback from the current sensors 114 to control the torque produced by the electric motor. In an exemplary embodiment, the controller 110 is configured to operate in a voltage control mode in response to detecting and/or determining an error of one of the current sensors. For example, in accordance with one embodiment, if the current sensor monitoring block 118 detects and/or identifies a current sensor error, the current sensor monitoring block 118 may select the voltage control mode by activating or otherwise changing the status of the selection arrangement 124 such that the output of the voltage control module 122 is provided to the input of the PWM command block 120 and the current regulated control module 116 is decoupled from the PWM command block 120. In this regard, the voltage control module 122 is coupled to the PWM command block 120 via the selection arrangement 124.

In an exemplary embodiment, in the voltage control mode, the torque control process 400 determines a voltage command and slip frequency command based on the torque command and the instantaneous motor speed, and operates the inverter and/or electrical system based on the voltage command the slip frequency command to attempt to produce the commanded torque with minimal input current to the electric motor (tasks 416, 418, 420). In an exemplary embodiment, the voltage command block 302 determines and/or obtains synchronous frame voltage commands ($v^*_d$ and $v^*_q$) based on the torque command ($T^*$) and the instantaneous speed ($\omega_r$) of the electric motor 106. The voltage command block 302 may obtain the synchronous voltage that corresponds to the commanded torque ($T^*$) and the motor speed ($\omega_r$) from a table and/or database implemented during the motor characterization process (e.g., task 404) as set forth above. In this manner, the synchronous voltage command corresponds to the synchronous voltage across the motor windings previously identified as producing the commanded torque ($T^*$) with minimal input current to the electric motor 106. In a similar manner, the slip frequency command block 304 determines and/or obtains a slip frequency command ($\omega^*_{sl}$) based on the torque command ($T^*$) and the instantaneous speed ($\omega_r$) of the electric motor 106. The slip frequency command block 304 may obtain the slip frequency that corresponds to the commanded torque ($T^*$) and the motor speed ($\omega_r$) from a table and/or database implemented during the motor characterization process (e.g., task 406) as set forth above. In this manner, the slip frequency command corresponds to the previously identified slip frequency for the electric motor 106 producing the commanded torque ($T^*$) with minimal input current. In this manner, the slip frequency command may compensate for the inability to accurately measure and/or calculate the actual slip frequency of the electric motor 106 due to an error in one of the current sensors 114. The synchronous-to-stationary transformation block 308 generates stationary voltage commands ($v^*_a$, $v^*_b$, and $v^*_c$) for producing the commanded torque based on the synchronous voltage commands ($v^*_d$ and $v^*_q$) and the slip frequency command ($\omega^*_{sl}$). The PWM command block 120 determines PWM commands for the phase legs of the inverter 104 based on the stationary voltage commands ($v^*_a$, $v^*_b$, and $v^*_c$) in a similar manner as set forth above in the context of the current-regulated control mode. In an exemplary embodiment, the electrical system 100 and/or torque control process 400 may continue operating in the voltage control mode by obtaining a torque command and repeating the loop defined by tasks 416, 418, and 420 until the current sensors 114 are replaced, repaired, or otherwise restored to their proper functionality.

It should be noted that in the voltage control mode, because torque produced by the electric motor is not as strongly related to the voltage across the motor windings, the ability to control the torque in the electric motor 106 may be somewhat impaired in comparison to the current-regulated control mode. For example, the torque produced by the electric motor 106 may exhibit a slower response to changes in the commanded torque, or the torque produced by the electric motor 106 may oscillate. However, the voltage control mode allows the electric motor 106 to produce a torque that is relatively close to the commanded torque while at the same time attempting to achieve optimal efficiency by attempting to minimize the input current to the electric motor 106.

One advantage of the methods and/or systems described above is that the electric motor and/or inverter are operated based on a voltage command and a slip frequency command and without relying on feedback information pertaining to the motor current. The voltage control mode adds redundancy to the electrical system and allows controlled operation of the electric motor without feedback by using voltage commands and slip frequency commands based on the closed-loop current-regulated feedback system, thereby effectively approximating the closed-loop current-regulated feedback system in the absence of motor current feedback information. Although the torque control may not be as precise or accurate as current-regulated torque control, the voltage control mode produces a torque that is relatively close to the commanded torque while at the same time attempting to minimize the input current to the electric motor 106.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for producing a commanded torque in an electric motor in a vehicle in response to a torque command, the electric motor being coupled to an inverter, the method comprising:
   obtaining the torque command;
   obtaining a speed of the electric motor; and
   operating the inverter based at least in part on a voltage command corresponding to minimal current through the electric motor for producing the commanded torque at the speed of the electric motor.

2. A method for producing a commanded torque in an electric motor in a vehicle in response to a torque command, the electric motor being coupled to an inverter, the method comprising:
   obtaining the torque command;
   obtaining a speed of the electric motor;
   obtaining a synchronous voltage command corresponding to a minimal current through the electric motor for producing the commanded torque at the speed of the electric motor;
   obtaining a slip frequency command corresponding to the minimal current for the torque command and the speed of the electric motor; and
   operating the inverter based on the synchronous voltage command, the slip frequency command, and the speed of the electric motor.

3. The method of claim 2, further comprising determining stationary voltage commands based on the synchronous voltage command, the slip frequency command, and the speed of the electric motor, wherein operating the inverter comprises generating pulse-width modulation commands for controlling the inverter based on the stationary voltage commands.

4. The method of claim 2, the electric motor having a range of possible torque values and a range of possible speed values, wherein the method further comprises for each combination of a torque value within the range of possible torque values and a speed value within the range of possible speed values:
   determining a respective synchronous voltage corresponding to minimal motor current for a respective combination of torque value and speed value; and storing the respective synchronous voltage in a first table, wherein the first table maintains an association between the respective synchronous voltage and the respective combination of torque value and speed value.

5. The method of claim 4, wherein obtaining the synchronous voltage command comprises obtaining the respective synchronous voltage from the first table that corresponds to the combination of the torque command and the speed of the electric motor.

6. The method of claim 5, further comprising, for each combination of a torque value within the range of possible torque values and a speed value within the range of possible speed values:
   determining a respective slip frequency corresponding to minimal motor current for the respective combination of torque value and speed value; and
   storing the respective slip frequency in a second table, wherein the second table maintains an association between the respective slip frequency and the respective combination of torque value and speed value.

7. The method of claim 6, wherein obtaining the slip frequency command comprises obtaining the respective slip frequency from the second table that corresponds to the combination of the torque command and the speed of the electric motor.

8. A method for producing a commanded torque in an electric motor in a vehicle in response to a torque command, the electric motor being coupled to an inverter, the method comprising:
   obtaining the torque command;
   obtaining a speed of the electric motor; and
   measuring current flowing through the electric motor using a current sensor to obtain a measured motor current;
   operating the inverter in a current-regulated control mode based on the measured motor current;
   identifying a current sensor error; and
   operating the inverter in a voltage control mode in response to identifying the current sensor error, wherein operating the inverter in the voltage control mode comprises operating the inverter based at least in part on the voltage command corresponding to minimal current through the electric motor for producing the commanded torque at the speed of the electric motor.

9. A method for controlling an electric motor in response to a torque command, wherein the electric motor is coupled to an inverter configured to drive the electric motor, the method comprising:
   obtaining the torque command;
   obtaining a motor speed for the electric motor;
   obtaining a voltage command corresponding to a minimal motor current for the torque command and the motor speed;
   obtaining a slip frequency command corresponding to the minimal motor current for the torque command and the motor speed; and
   operating the inverter based on the voltage command and the slip frequency command.

10. The method of claim 9, the electric motor having a range of possible torque values and a range of possible speed values, wherein the method further comprises for each combination of a torque value within the range of possible torque values and a speed value within the range of possible speed values:
   determining a respective synchronous voltage corresponding to minimal motor current for a respective combination of torque value and speed value; and
   storing the respective synchronous voltage in a first table, wherein the first table maintains an association between the respective synchronous voltage and the respective combination of torque value and speed value.

11. The method of claim 10, wherein obtaining the voltage command comprises obtaining the respective synchronous voltage from the first table that corresponds to the combination of the torque command and the motor speed.

12. The method of claim 11, wherein the method further comprises for each combination of a torque value within the range of possible torque values and a speed value within the range of possible speed values:
   determining a respective slip frequency corresponding to minimal motor current for a respective combination of torque value and speed value; and
   storing the respective slip frequency in a second table, wherein the second table maintains an association between the respective slip frequency and the respective combination of torque value and speed value.

13. The method of claim 12, wherein obtaining the slip frequency command comprises obtaining the respective slip frequency from the second table that corresponds to the combination of the torque command and the motor speed.

14. The method of claim 9, wherein operating the inverter comprises:
   determining stationary voltage commands based on the voltage command, the slip frequency command, and the motor speed; and
   generating pulse-width modulation commands for the inverter based on the stationary voltage commands.

15. The method of claim 9, further comprising:
   determining a current command based at least in part on the torque command and the motor speed;
   measuring current in the electric motor using a current sensor to obtain a measured motor current;
   operating the inverter based on a difference between the current command and the measured motor current; and
   detecting a current sensor error, wherein operating the inverter based on the voltage command and the slip frequency command comprises operating the inverter based on the voltage command and the slip frequency command in response to detecting the current sensor error.

16. An electrical system for use in a vehicle, the electrical system comprising:
   an energy source;
   an electric motor;
   an inverter coupled between the energy source and the electric motor;
   a resolver system coupled to the electric motor, the resolver system being configured to obtain a motor speed for the electric motor; and
   a controller coupled to the inverter and the resolver system, wherein the controller is configured to:
      obtain a torque command; and
      operate the inverter based at least in part on a voltage command and a slip frequency command corresponding to minimal motor current for the combination of the torque command and the motor speed.

17. The electrical system of claim 16, the electric motor having a range of possible torque values and a range of possible speed values, wherein the controller includes:
   a first table configured to store, for each combination of a torque value within the range of possible torque values and a speed value within the range of possible speed values, a respective synchronous voltage corresponding to minimal motor current for a respective combination of torque value and speed value; and a second table configured to store, for each combination of a torque value within the range of possible torque values and a speed value within the range of possible speed values, a respective slip frequency corresponding to minimal motor current for the respective combination of torque value and speed value.

18. The electrical system of claim 17, wherein the controller is configured to:

obtain the voltage command from the first table based on the torque command and the motor speed, the voltage command corresponding to the respective synchronous voltage for the combination of the torque command and the motor speed; and obtain the slip frequency command from the second table based on the torque command and the motor speed, the slip frequency command corresponding to the respective slip frequency for the combination of the torque command and the motor speed.

19. The electrical system of claim 18, wherein the controller is configured to:

determine stationary voltage commands based on the voltage command, the slip frequency command, and the motor speed; and generate pulse-width modulation signals for operating the inverter based on the stationary voltage commands.

20. The electrical system of claim 16, further comprising a current sensor coupled between the inverter and the electric motor, the current sensor being configured to obtain a measured current, wherein the controller is coupled to the current sensor and configured to:

operate the inverter based at least in part on a current command and the measured current, the current command being based at least in part on the torque command;

detect an error in the current sensor; and operate the inverter based on the voltage command and the slip frequency command in response to the error.

* * * * *